(12) United States Patent
Gershtein

(10) Patent No.: US 6,688,115 B1
(45) Date of Patent: Feb. 10, 2004

(54) HIGH-PRESSURE DELIVERY SYSTEM FOR ULTRA HIGH PURITY LIQUID CARBON DIOXIDE

(75) Inventor: Vladimir Yliy Gershtein, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/353,188

(22) Filed: Jan. 28, 2003

(51) Int. Cl.[7] .............................. F17C 5/00; B01D 9/04; C02F 1/22; F04B 19/24; F04F 1/18
(52) U.S. Cl. ......................... 62/54.1; 62/537; 417/207
(58) Field of Search ...................... 62/54.1, 537, 50.1; 417/207

(56) References Cited

U.S. PATENT DOCUMENTS

| | | | | | |
|---|---|---|---|---|---|
| 4,695,302 A | * | 9/1987 | Tyree, Jr. | ..................... | 62/603 |
| 5,507,146 A | * | 4/1996 | Bjerklie | ........................ | 62/601 |
| 5,787,940 A | * | 8/1998 | Bonn et al. | .................... | 141/18 |
| 6,023,933 A | | 2/2000 | Langan et al. | ................ | 62/50.2 |
| 6,260,361 B1 | * | 7/2001 | Tyree, Jr. | ...................... | 62/54.1 |
| 6,327,872 B1 | * | 12/2001 | Boyd et al. | ................... | 62/636 |
| 6,405,541 B1 | * | 6/2002 | Brunnhofer | .................. | 62/54.1 |

* cited by examiner

Primary Examiner—William C. Doerrler
(74) Attorney, Agent, or Firm—R. P. Morris-Oskanian

(57) ABSTRACT

This invention relates to an improvement in a process and apparatus for delivering ultra high purity liquid carbon dioxide to a point of use at pressures above ambient without pumping. In the process a high purity carbon dioxide feed in gaseous or liquid form is charged to a vessel and liquified. As the liquid is converted to a solid phase, additional liquid is added until the vessel is at least substantially filled with slush. Once filled, the slush or solid is isochorically heated, i.e., heated at constant volume whereby the solid phase carbon dioxide is converted to a liquid. Liquid, then, is withdrawn from the vessel at a desired pressure at a rate at which the solid phase carbon dioxide is converted to a liquid.

10 Claims, 1 Drawing Sheet

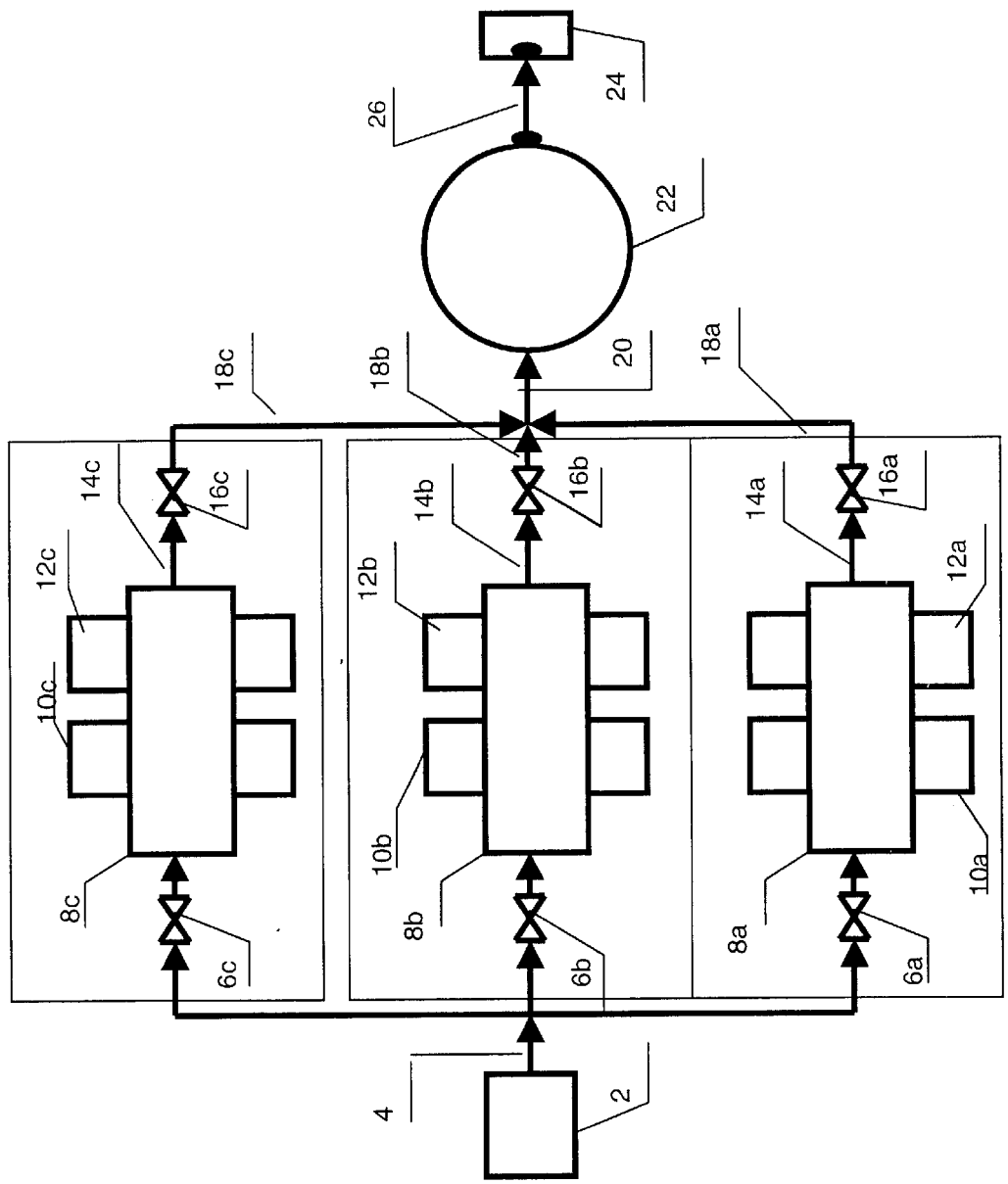

HIGH-PRESSURE DELIVERY SYSTEM FOR ULTRA HIGH PURITY LIQUID CARBON DIOXIDE

BACKGROUND OF THE INVENTION

Highly pressurized, ultra high pure liquid carbon dioxide is required for a variety of industrial processes. For example, some of the evolving applications in the electronic industry demand the use of supercritical carbon dioxide at high flow rates and high pressures. One of the methods for achieving high pressure carbon dioxide has been to pump liquid carbon dioxide to a desired pressure. However, pumping liquid carbon dioxide to a high pressure can introduce impurities, such as particulates, hydrocarbons, halocarbons, etc., to the product stream.

Other applications, such as photo-resist removal, deposition, lithography, etc, require ultra high purity (UHP) liquid carbon dioxide delivered to a point of use (POU) in pressure range from 2,000 psig to 10,000 psig. The latter depends on many factors for example, specifics of an application, tool design, process philosophy, etc.

The following patents found during a patent search are representative of process for delivery of ultra high purity high pressure gases including liquid carbon dioxide. The common feature of these patents is an attempt to create a pump free system to elevate gas pressure while preserving gas purity.

U.S. Pat. No. 6,023,933 discloses a process which is capable of delivering UHP argon at pressures up to 67,000 psig. In the process a high purity gas is provided in a liquefied physical state, introduced to a vaporization vessel, and then, heated in an isochoric vaporizer sufficiently to vaporize the liquefied gas. As the liquid is vaporized in the isochoric vaporizer the pressure builds to the desired pressure, e.g., from 10,000 to 60,000 psig. When the liquid is substantially vaporized, another unit is used for vapor delivery. This process is good for gas delivery but can not be used to deliver liquid phase to the point of use.

U.S. Pat. No. 6,327,872 discloses a process for delivering liquid carbon dioxide to a point of use at pressures of 750 to 1020 psig. The patent acknowledges in the background the production of high-pressure liquid delivery systems up to about 68 bar by means of a pump and the problems associated therewith. Their approach is to deliver liquid carbon dioxide to an accumulation vessel and then heat the liquid carbon dioxide contained therein thereby elevating the pressure. Using this method is possible to elevate liquid carbon dioxide from a bulk supply pressure of approximately 300 psig to a maximum of about 1020 psig. If isochoric heating continues above the critical point of about 310° C., liquid carbon dioxide is converted into a supercritical fluid. Thus, the practical limitation of this process as a liquid delivery system is under the carbon dioxide critical pressure of about 1071 psig and at a temperature below 31° C. This process is limited by the maximum achievable pressure of liquid carbon dioxide which can be delivered to a point of use. Also, there is no provision for a mechanism for liquid delivery from the heated vessel unless the liquid is pressurized by means of another fluid at higher pressure. The use of different fluid (other then purified carbon dioxide) can potentially lead to delivered product contamination.

Therefore, there is a need to create a system which can deliver UHP high pressure liquid carbon dioxide, e.g., greater than about 1071 psig from a purifier to a point of use (POU) without the use of any mechanical devices.

SUMMARY OF INVENTION

This invention relates to an improvement in a process and apparatus for delivering high pressure liquid carbon dioxide to a point of use at pressures above ambient pressure without pumping or use of any mechanical devises with moving parts. In the process a high purity carbon dioxide feed in gaseous or preferably in liquid form is charged to a vessel and at least partially solidified. As the liquid is converted to a solid phase, additional liquid is added until the vessel is at least substantially filled. Once filled, the liquid is isochorically heated, i.e., heated at constant volume whereby initialy the solid phase carbon dioxide is partially converted to a liquid until a desired pressure is reached. Liquid, then, is withdrawn from the vessel at a desired pressure at a rate at which the solid phase carbon dioxide is converted to a liquid.

There are significant advantages to the process for delivering liquid carbon dioxide to a point of use and these include:

- an ability to avoid the use of pumps or compressors and yet being able to deliver purified carbon dioxide liquid stream to a point of use at virtually any desired pressure;
- an ability to deliver a supercritical fluid to the point of use (POU) at the desired pressure with minimal energy input. For example, one can utilize the energy already delivered with liquid carbon dioxide;
- an ability to achieve energy efficiency by operating over a narrow temperature range since the solid to liquid melting process occurs at practically constant temperature;
- an ability to deliver ultra high purity carbon dioxide to a point of use with simple, noncomplex equipment, e.g., chillers and heaters, without incurring contamination in the process due to complete exclusion of any source of contamination such as devises with moving parts, lubricats, seals, etc.; and,
- an ability to deliver liquid at high pressure at essentially room temperature.

DESCRIPTION OF THE DRAWING

The drawing is schematic of a three unit apparatus and process for the delivery of liquid carbon dioxide to a point of use at variable pressure by the isochoric eating of solid carbon dioxide.

DETAILED DESCRIPTION OF THE INVENTION

To facilitate an understanding of the apparatus and process, reference is made to the drawing. Three units are shown to illustrate alternate delivery of liquid carbon dioxide to a point of use. Included in the three unit scheme is a flow network having valves associated with conduits to allow for an intermediate liquid stream to be alternately introduced to the respective vessels and to be alternately delivered from these vessels such that: prior to one of the vessels becoming significantly reduced on solid CO2, a liquid stream is withdrawn from another of said vessels having a source of solid carbon dioxide therein, thereby to ensure continual delivery of said pressurized liquid carbon dioxide.

In operation a stream of gaseous or liquid carbon dioxide at initial delivery parameters, for example liquid carbon dioxide at 300 psig at −5° F. is delivered to tank 2. Carbon dioxide then is removed from tank 2 by means of line 4, passed through check valves 6a, 6b, or 6c and then to vessels 8a, 8b or 8c respectively. Carbon dioxide is converted to liquid form, if received in gaseous form from tank 2, and then at least partially solidified in these vessels, i.e., vessels 8a, 8b, or 8c with the help of chillers 10a, 10b, or 10c respectively. The function of the chillers is to simply lower the carbon dioxide temperature inside vessels 8a, 8b, or 8c to a temperature below the carbon dioxide solidification point. As solid carbon dioxide is formed, additional carbon dioxide from tank 2 is added to the respective vessels 8a, 8b, or 8c until that vessel is substantially, or preferably completely, filled with solid carbon dioxide or preferably with a solid-liquid mixture of carbon dioxide, i.e., slush. At that time vessel 8a, 8b or 8c is separated from tank 2 by closing appropriate valve 6a, 6b, or 6c.

To effect conversion of solid phase carbon dioxide to liquid and pressurization thereof, the apparatus incorporates heaters 12a, 12b, or 12c. These heaters, which are attached or built into the respective vessels 8a, 8b or 8c, are activated for heating and effecting the melting of solid form of carbon dioxide. Conversion of solid carbon dioxide to a liquid under isochoric heating, i.e. maintaining a constant volume of the heated vessel, provides the mechanism to increase the pressure of the resulting liquid carbon dioxide to any pressure desired in the process. And, such pressure increase can be obtained without effecting a significant change in the average slush temperature or internal temperature of carbon dioxide within the vessel. Operating over a narrow temperature range allows for efficient use of the chillers and heaters retained within the vessels or attached to it.

Since the density of the solid carbon dioxide is approximately 1.5 times greater then that of carbon dioxide in the liquid state, a significant volume of liquid carbon dioxide can be removed from vessel 8a, 8b or 8c at any preselected pressure. Liquid carbon dioxide is withdrawn from vessels 8a, 8b and 8c via lines 14a, 14b and 14c and passed through pressure control valves 16a, 16b and 16c respectively. Pressure control valves 16a, 16b and 16c maintain appropriate pressure within vessels, 8a, 8b, or 8c. Liquid carbon dioxide is carried via lines 18a, 18b and 18c respectively via line 20 and to surge tank 22. The final product can be delivered to the point of use process chamber 24 via line 26 from surge tank 22 at a desired pressure, as for example, between 300 and 10,000 psig, and at a delivery temperature, for example, of room temperature, e.g., 77° F. but below the critical temperature.

Liquid carbon dioxide product is removed from each vessel at a rate which is generally equal to the melting rate of the solid carbon dioxide within each vessel 8a, 8b or 8c. In this way, then, the removal of liquid carbon dioxide from each vessel will be immediately replaced with liquid carbon dioxide formed on conversion of the solid carbon dioxide to liquid carbon dioxide. By effecting withdrawal of liquid carbon dioxide at a rate substantially equal to the rate of formation of liquid carbon dioxide, the pressure inside vessels 8a, 8b or 8c can be maintained at the desired level. Withdrawal of liquid carbon dioxide from the process is terminated when the solid phase carbon dioxide is substantially or completely converted to liquid. At that point, the cycle starts from the beginning, which means that the solidification process takes place in another vessel and a new stream of carbon dioxide from tank 2 will be delivered to that vessel.

In general, a three phase mixture of solid, liquid, and gaseous carbon dioxide can be maintained inside vessels 8a, 8b, and 8c. The presence of a gas phase will make it more difficult to reach the very high pressures due to its compressibility. Nevertheless, if a relatively low final pressure is desired, e.g., 2000 psig, , then a compressible phase will play a beneficial role during liquid removal cycle acting as a damper for pressure inside vessel 8a, 8b, or 8c reducing pressure fluctuation.

Several loops, as shown in the three unit system can be used to provide continuous flow of high pressure liquid carbon dioxide to surge tank 22. Each loop typically will be operated with a cycle shifted in time relative to the neighboring loop.

Conventional materials of construction, e.g., steel may be used, preferably stainless steel. Electro-polished stainless steel can be used if necessary.

What is claimed is:

1. A process for producing a liquid phase carbon dioxide stream at elevated pressure comprising the steps:
   (a) introducing a feed stream comprised of carbon dioxide to a vessel;
   (b) converting at least a portion of the carbon dioxide in said vessel to a solid phase;
   (c) converting at least a portion of the solid phase carbon dioxide in said vessel to a liquid phase carbon dioxide while maintaining a constant volume of carbon dioxide within said vessel whereby said liquid phase carbon dioxide is generated at elevated pressure; and,
   (d) withdrawing said liquid phase carbon dioxide at elevated pressure from said vessel.

2. The process of claim 1 wherein the feed stream is liquid carbon dioxide and it is delivered to said vessel for conversion to solid phase carbon dioxide.

3. The process of claim 1 wherein the elevated pressure of said liquid carbon dioxide is from 300 to 10,000 psig.

4. The process of claim 3 wherein the feed stream of carbon dioxide is introduced to said vessel in step (a) until said vessel is filled, and wherein the carbon dioxide is converted in step (b) to a slush comprised of solid and liquid carbon dioxide.

5. The process of claim 4 wherein conversion of solid phase carbon dioxide to liquid phase carbon dioxide within said vessel is effected by indirect heat exchange within said vessel.

6. The process of claim 5 wherein conversion of the feed stream carbon dioxide to solid phase within said vessel is effected by indirect heat exchange within said vessel.

7. An apparatus for producing a pressurized liquid carbon dioxide stream comprising:
   (a) a vessel for receiving carbon dioxide;
   (b) a chiller means capable of converting carbon dioxide to a solid form in said vessel;
   (c) a heater capable of converting said carbon dioxide in solid form retained in said vessel to liquid carbon dioxide; and,
   (d) a flow network having conduits connecting said vessel for discharging pressurized liquid carbon dioxide stream therefrom.

8. The apparatus of claim 7 wherein there are at least first and second pressure vessels for converting carbon dioxide to a solid and effecting the conversion of solid carbon dioxide to a liquid.

9. The apparatus of claim 8 wherein there is a flow network having valves associated with conduits to allow for a liquid stream to be alternately introduced to said first and second pressure vessels and to be alternately delivered from said first and second vessels such that: prior to one of said first and second vessels becoming empty, the other of said first and second vessels is activated, thereby to ensure continual delivery of said pressurized liquid carbon dioxide.

10. In a process for producing a liquid phase carbon dioxide stream at an elevated pressure greater than about 1071 psig, the improvement which comprises the steps:

(a) introducing a feed stream comprised of carbon dioxide to a vessel;

(b) converting at least a portion of the carbon dioxide in said vessel to a solid phase;

(c) converting at least a portion of the solid phase carbon dioxide in said vessel to a liquid phase carbon dioxide while maintaining a constant volume of carbon dioxide within said vessel whereby said liquid phase carbon dioxide is generated at elevated pressure greater than about 1071 psig without the use of pumps; and, (d) withdrawing said liquid phase carbon dioxide at elevated pressure greater than about 1071 psig from said vessel.

* * * * *